United States Patent
Foudazi et al.

(10) Patent No.: US 9,574,058 B2
(45) Date of Patent: Feb. 21, 2017

(54) METHOD FOR THE PRODUCTION OF HIGH INTERNAL PHASE EMULSION FOAMS

(71) Applicant: The Procter & Gamble Company, Cincinnati, OH (US)

(72) Inventors: Reza Foudazi, Las Cruces, NM (US); Cody Bezik, Chardon, OH (US); Donald L. Feke, Chesterland, OH (US); Ica Manas-Zloczower, Orange, OH (US); Steven Ray Merrigan, West Chester, OH (US); Stuart J. Rowan, Cleveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 63 days.

(21) Appl. No.: 14/730,954

(22) Filed: Jun. 4, 2015

(65) Prior Publication Data
US 2015/0353699 A1    Dec. 10, 2015

Related U.S. Application Data

(60) Provisional application No. 62/008,885, filed on Jun. 6, 2014.

(51) Int. Cl.
| | | |
|---|---|---|
| *C08J 9/28* | (2006.01) | |
| *C08J 9/00* | (2006.01) | |
| *B29C 67/20* | (2006.01) | |
| *B29C 44/34* | (2006.01) | |
| *C08F 2/22* | (2006.01) | |
| *B29C 44/02* | (2006.01) | |

(52) U.S. Cl.
CPC ............ *C08J 9/0023* (2013.01); *B29C 44/022* (2013.01); *B29C 44/3403* (2013.01); *B29C 67/202* (2013.01); *C08F 2/22* (2013.01); *C08J 9/28* (2013.01); *C08J 9/283* (2013.01); *C08J 2201/028* (2013.01); *C08J 2205/06* (2013.01); *C08J 2333/08* (2013.01)

(58) Field of Classification Search
CPC .. B29C 44/022; B29C 44/3403; B29C 67/202; C08F 2/22; C08J 9/0023; C08J 9/28; C08J 9/283; C08J 2201/028; C08J 2205/06; C08J 2333/08
See application file for complete search history.

(56) References Cited

U.S. PATENT DOCUMENTS

| | | |
|---|---|---|
| 6,299,808 B1 | 10/2001 | Mork et al. |
| 6,630,519 B2 | 10/2003 | Fujimaru et al. |
| 2004/0002555 A1* | 1/2004 | Nagasuna .......... C08F 2/32 521/65 |
| 2005/0197414 A1 | 9/2005 | Granberg et al. |
| 2011/0159135 A1 | 6/2011 | DesMarais |
| 2011/0159206 A1* | 6/2011 | Merrigan .......... B29C 33/68 427/553 |

OTHER PUBLICATIONS

PCT International Search Report, PCT/US2015/034455, mailed Aug. 20, 2015, 10 pages.

* cited by examiner

*Primary Examiner* — Irina S Zemel
(74) *Attorney, Agent, or Firm* — Andres E. Velarde

(57) ABSTRACT

A method for producing a High Internal Phase Emulsion foam is provided that comprises forming a first High Internal Phase Emulsion from an oil phase comprising monomer, crosslinking agent, emulsifier; and an aqueous phase. The High Internal Phase Emulsion is pumped into a water bath. The High Internal Phase Emulsion cures in the bath.

19 Claims, 2 Drawing Sheets

METHOD FOR THE PRODUCTION OF HIGH INTERNAL PHASE EMULSION FOAMS

FIELD OF THE INVENTION

This application relates to a process for the production of High Internal Phase Emulsion (HIPE) foam using a water bath to control properties of the foam.

BACKGROUND OF THE INVENTION

An emulsion is a dispersion of one liquid in another liquid and generally is in the form of a water-in-oil mixture having an aqueous or water phase dispersed within a substantially immiscible continuous oil phase. Water-in-oil (or oil-in-water) emulsions having a high ratio of dispersed aqueous phase to continuous oil phase are known in the art as High Internal Phase Emulsions, also referred to as "HIPE" or HIPEs. At relatively high dispersed aqueous phase to continuous oil phase ratios the continuous oil phase becomes essentially a thin film separating and coating the droplet-like structures of the internal, dispersed aqueous phase. The continuous oil phase of a water-in-oil HIPE generally comprises one or more polymerizable monomers. These monomers can be polymerized, forming a cellular structure, for example a foam, having a cell size distribution defined by the size distribution of the dispersed, aqueous phase droplets.

Polymerization of monomers in a HIPE usually involves the application of thermal energy or heat. The HIPE can be subjected to heat in an enclosed area, such as an oven; and the heat source can be varied, such as steam or direct application of heat through one or more heating elements. However there are several significant drawbacks to using heat alone for curing HIPEs. A HIPE usually has a large surface area and the unequal application of heat to such a large surface can cause defects in the resulting HIPE foam, such as dimpling, shrinkage, and edge curls. Further, whatever form the heat application takes such application is usually quite expensive in energy and monetary costs, as the heat being applied to a HIPE usually has a temperature ranging from around 50° C. to 150° C. An additional drawback to the use of heat alone to polymerize HIPEs is that an enclosed area, such as an oven, is required to keep the heat from escaping into the environment and reducing the amount of heat applied to the HIPE. This need for an oven further increases the cost of producing HIPE foams and takes up a large amount of physical space on the HIPE foam production line.

As such, there is a need for a method to polymerize the HIPE in a controlled fashion while allowing for additional degrees of freedom regarding the polymerization system.

SUMMARY OF THE INVENTION

A method for producing a High Internal Phase Emulsion foam is provided that comprises forming a first High Internal Phase Emulsion from an oil phase comprising monomer, crosslinking agent, emulsifier; and an aqueous phase. Either the oil phase or the aqueous phase comprises an initiator. The High Internal Phase Emulsion is pumped into a water bath. The High Internal Phase Emulsion cures in the bath.

A method for producing a High Internal Phase Emulsion foam is provided that comprises providing an aqueous phase; a first oil phase having monomer, cross-linking agent, and emulsifier. An aqueous phase is combined with the first oil phase. The aqueous phase and the first oil phase are then emulsified to form a first High Internal Phase Emulsion. The High Internal Phase Emulsion is pumped into a water bath where it cures to form a High Internal Phase Emulsion foam.

A method for producing a High Internal Phase Emulsion foam is provided that comprises providing an aqueous phase; a first oil phase having monomer, cross-linking agent, and emulsifier. An aqueous phase is combined with the first oil phase. The aqueous phase and the first oil phase are then emulsified to form a first High Internal Phase Emulsion. The High Internal Phase Emulsion is pumped into a water bath comprising between 0.1% and 5% NaCl. The emulsion cures in the water bath to form a High Internal Phase Emulsion foam.

DETAILED DESCRIPTION OF THE INVENTION

Figure 1:
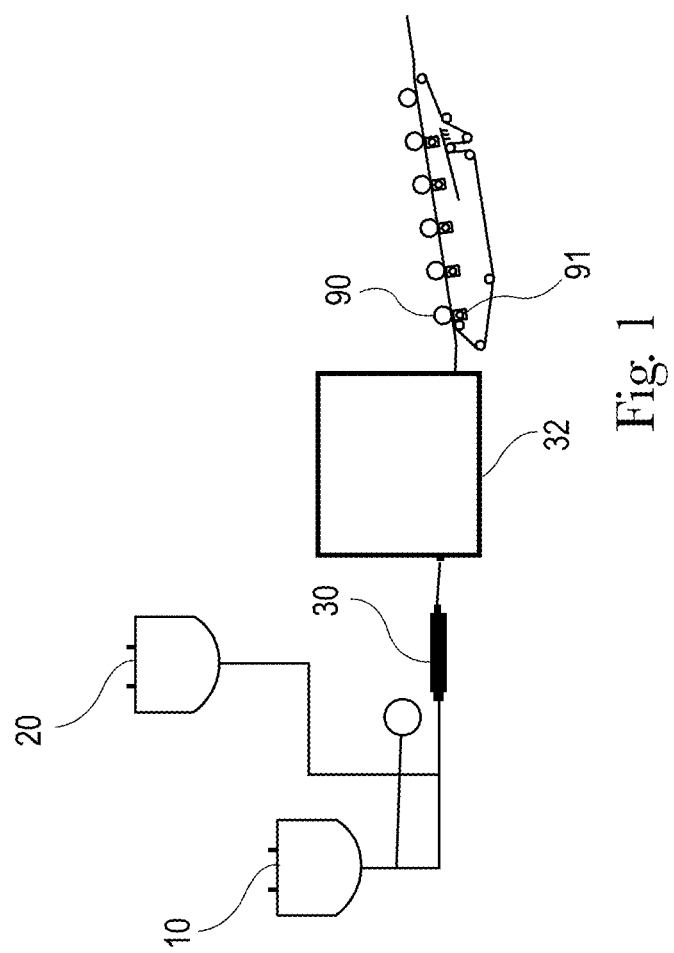
FIG. 1 is a process flow diagram of the present invention.

The present invention relates to a method of using a water bath to polymerize a High Internal Phase Emulsion (HIPE). The characteristics of the polymerized HIPE foam may be varied depending on the composition and characteristics of the water bath. The HIPEs are produced using a continuous process, for example by having a HIPE pumped into a water bath while traveling through the bath. The HIPE foams produced from the method of the present invention are useful for the absorption of liquid materials.

A High Internal Phase Emulsion (HIPE) comprises two phases. One phase is a continuous oil phase comprising monomers that are polymerized to form a HIPE foam and an emulsifier to help stabilize the HIPE. The monomer component may be present in an amount of from about 80% to about 99%, and in certain embodiments from about 85% to about 95% by weight of the oil phase. The emulsifier component, which is soluble in the oil phase and suitable for forming a stable water-in-oil emulsion may be present in the oil phase in an amount of from about 1% to about 20% by weight of the oil phase. The emulsion may be formed at an emulsification temperature of from about 20° C. to about 130° C. and in certain embodiments from about 50° C. to about 100° C.

In general, the monomers will include from about 20% to about 97% by weight of the oil phase at least one substantially water-insoluble monofunctional alkyl acrylate or alkyl methacrylate. For example, monomers of this type may include $C_4$-$C_{18}$ alkyl acrylates and $C_2$-$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate. In certain embodiments, blends of these monomers can provide the desired glass transition temperature (Tg) of the resulting HIPE foams.

The oil phase may also comprise from about 2% to about 40%, and in certain embodiments from about 10% to about 30%, by weight of the oil phase, a substantially water-insoluble, polyfunctional crosslinking alkyl acrylate or methacrylate. This crosslinking comonomer, or crosslinker, is added to confer strength and resilience to the resulting HIPE foam. Examples of crosslinking monomers of this type comprise monomers containing two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, and the like. Other examples of crosslinkers contain a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed.

Any third substantially water-insoluble comonomer may be added to the oil phase in weight percentages of from about 0% to about 15% by weight of the oil phase, in certain embodiments from about 2% to about 8%, to modify properties of the HIPE foams. In certain cases, "toughening" monomers may be desired which impart toughness to the resulting HIPE foam. These include monomers such as styrene, vinyl chloride, vinylidene chloride, isoprene, and chloroprene. Without being bound by theory, it is believed that such monomers aid in stabilizing the HIPE during polymerization (also known as "curing") to provide a more homogeneous and better formed HIPE foam which results in better toughness, tensile strength, abrasion resistance, and the like. Monomers may also be added to confer flame retardancy as disclosed in U.S. Pat. No. 6,160,028 (Dyer) issued Dec. 12, 2000. Monomers may be added to confer color, for example vinyl ferrocene, fluorescent properties, radiation resistance, opacity to radiation, for example lead tetraacrylate, to disperse charge, to reflect incident infrared light, to absorb radio waves, to form a wettable surface on the HIPE foam struts, or for any other desired property in a HIPE foam. In some cases, these additional monomers may slow the overall process of conversion of HIPE to HIPE foam, the tradeoff being necessary if the desired property is to be conferred. Thus, such monomers can be used to slow down the polymerization rate of a HIPE. Examples of monomers of this type comprise styrene and vinyl chloride.

The oil phase may further contain an emulsifier used for stabilizing the HIPE. Emulsifiers used in a HIPE can include: (a) sorbitan monoesters of branched $C_{16}$-$C_{24}$ fatty acids; linear unsaturated $C_{16}$-$C_{22}$ fatty acids; and linear saturated $C_{12}$-$C_{14}$ fatty acids, such as sorbitan monooleate, sorbitan monomyristate, and sorbitan monoesters, sorbitan monolaurate diglycerol monooleate (DGMO), polyglycerol monoisostearate (PGMIS), and polyglycerol monomyristate (PGMM); (b) polyglycerol monoesters of -branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (for example diglycerol monoesters of C18:1 fatty acids), diglycerol monomyristate, diglycerol monoisostearate, and diglycerol monoesters; (c) diglycerol monoaliphatic ethers of -branched $C_{16}$-$C_{24}$ alcohols, linear unsaturated $C_{16}$-$C_{22}$ alcohols, and linear saturated $C_{12}$-$C_{14}$ alcohols, and mixtures of these emulsifiers. See U.S. Pat. No. 5,287,207 (Dyer et al.), issued Feb. 7, 1995 and U.S. Pat. No. 5,500,451 (Goldman et al.) issued Mar. 19, 1996. Another emulsifier that may be used is polyglycerol succinate (PGS), which is formed from an alkyl succinate, glycerol, and triglycerol.

Such emulsifiers, and combinations thereof, may be added to the oil phase so that they comprise between about 1% and about 20%, in certain embodiments from about 2% to about 15%, and in certain other embodiments from about 3% to about 12% by weight of the oil phase In certain embodiments, coemulsifiers may also be used to provide additional control of cell size, cell size distribution, and emulsion stability, particularly at higher temperatures, for example greater than about 65° C. Examples of coemulsifiers include phosphatidyl cholines and phosphatidyl choline-containing compositions, aliphatic betaines, long chain $C_{12}$-$C_{22}$ dialiphatic quaternary ammonium salts, short chain $C_1$-$C_4$ dialiphatic quaternary ammonium salts, long chain $C_{12}$-$C_{22}$ dialkoyl(alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic imidazolinium quaternary ammonium salts, long chain $C_{12}$-$C_{22}$ monoaliphatic benzyl quaternary ammonium salts, long chain $C_{12}$-$C_{22}$ dialkoyl(alkenoyl)-2-aminoethyl, short chain $C_1$-$C_4$ monoaliphatic benzyl quaternary ammonium salts, short chain $C_1$-$C_4$ monohydroxyaliphatic quaternary ammonium salts. In certain embodiments, ditallow dimethyl ammonium methyl sulfate (DTDMAMS) may be used as a coemulsifier.

One component of the aqueous phase may be a water-soluble electrolyte. The water phase may contain from about 0.2% to about 40%, in certain embodiments from about 2% to about 20%, by weight of the aqueous phase of a water-soluble electrolyte. The electrolyte minimizes the tendency of monomers, comonomers, and crosslinkers that are primarily oil soluble to also dissolve in the aqueous phase. Examples of electrolytes include chlorides or sulfates of alkaline earth metals such as calcium or magnesium and chlorides or sulfates of alkali earth metals such as sodium. Such electrolyte can include a buffering agent for the control of pH during the polymerization, including such inorganic counterions as phosphate, borate, and carbonate, and mixtures thereof. Water soluble monomers may also be used in the aqueous phase, examples being acrylic acid and vinyl acetate.

Another component that may be present in the aqueous phase is a water-soluble free-radical initiator. The initiator can be present at up to about 20 mole percent based on the total moles of polymerizable monomers present in the oil phase. In certain embodiments, the initiator is present in an amount of from about 0.01 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, and other suitable azo initiators. In certain embodiments, to reduce the potential for premature polymerization which may clog the emulsification system, addition of the initiator to the monomer phase may be just after or near the end of emulsification.

In addition to the previously described components other components may be included in either the aqueous or oil phase of a HIPE. Examples include antioxidants, for example hindered phenolics, hindered amine light stabilizers; plasticizers, for example dioctyl phthalate, dinonyl sebacate; flame retardants, for example halogenated hydrocarbons, phosphates, borates, inorganic salts such as antimony trioxide or ammonium phosphate or magnesium hydroxide; dyes and pigments; fluorescers; filler particles, for example starch, titanium dioxide, carbon black, or calcium carbonate; fibers; chain transfer agents; odor absorbers, for example activated carbon particulates; dissolved polymers; dissolved oligomers; and the like.

HIPE foam is produced from the polymerization of the monomers comprising the continuous oil phase of a HIPE.

HIPE foam pore sizes may range from 1 to 200 μm and in certain embodiments may be less than 100 μm.

In another example, in the oil phase the type and amounts of monomer can be adjusted or during the formation of the HIPE the shear rate can be increased during the emulsion making process or the amount of time the HIPE is in the emulsion making step can be increased.

The HIPE foams of the present invention are relatively open-celled. This refers to the individual cells or pores of the HIPE foam being in substantially unobstructed communication with adjoining cells. The cells in such substantially open-celled HIPE foam structures have intercellular openings or windows that are large enough to permit ready fluid transfer from one cell to another within the HIPE foam structure. For purpose of the present invention, a HIPE foam is considered "open-celled" if at least about 80% of the cells in the HIPE foam that are at least 1 μm in size are in fluid communication with at least one adjoining cell.

In addition to being open-celled, in certain embodiments HIPE foams are sufficiently hydrophilic to permit the HIPE foam to absorb aqueous fluids, for example the internal surfaces of a HIPE foam may be rendered hydrophilic by residual hydrophilizing surfactants or salts left in the HIPE foam following polymerization, by selected post-polymerization HIPE foam treatment procedures (as described hereafter), or combinations of both.

In certain embodiments, for example when used in certain absorbent articles, the HIPE foam may be flexible and exhibit an appropriate glass transition temperature (Tg). The Tg represents the midpoint of the transition between the glassy and rubbery states of the polymer. In general, HIPE foams that have a higher Tg than the temperature of use can be very strong but will also be very rigid and potentially prone to fracture. In certain embodiments, regions of the HIPE foams of the current invention which exhibit either a relatively high Tg or excessive brittleness will be discontinuous. Since these discontinuous regions will also generally exhibit high strength, they can be prepared at lower densities without compromising the overall strength of the HIPE foam.

HIPE foams intended for applications requiring flexibility should contain at least one continuous region having a Tg as low as possible, so long as the overall HIPE foam has acceptable strength at in-use temperatures. In certain embodiments, the Tg of this region will be less than about 40° C. for foams used at about ambient temperature conditions, in certain other embodiments, less than about 30° C. For HIPE foams used in applications wherein the use temperature is higher or lower than ambient, the Tg of the continuous region may be no more that about 10° C. greater than the use temperature, in certain embodiments the same as use temperature, and in further embodiments about 10° C. less than use temperature wherein flexibility is desired. Accordingly, monomers are selected as much as possible that provide corresponding polymers having lower Tg's.

The HIPE foams of the present invention may be used as absorbent core materials in absorbent articles, such as feminine hygiene articles, for example pads, pantiliners, and tampons; disposable diapers; incontinence articles, for example pads, adult diapers, homecare articles, for example wipes, pads, towels; and beauty care articles, for example pads, wipes, and skin care articles, such as used for pore cleaning.

To produce a HIPE using the above, an aqueous phase 10 and an oil phase 20 are combined in a ratio between about 8:1 and 140:1. In certain embodiments, the aqueous phase to oil phase ratio is between about 10:1 and about 75:1, and in certain other embodiments the aqueous phase to oil phase ratio is between about 13:1 and about 65:1. This is termed the "water-to-oil" or W:O ratio and can be used to determine the density of the resulting HIPE foam. As discussed, the oil phase may contain one or more of monomers, comonomers, photoinitiators, crosslinkers, and emulsifiers, as well as optional components. The water phase will contain water and in certain embodiments one or more components such as electrolytes.

The HIPE can be formed from the combined aqueous 10 and oil 20 phases by subjecting these combined phases to shear agitation in a mixing chamber or mixing zone 30. The combined aqueous 10 and oil 20 phases are subjected to shear agitation produce a stable HIPE having aqueous droplets of the desired size. The emulsion making process produces a HIPE where the aqueous phase droplets are dispersed to such an extent that the resulting HIPE foam will have the desired structural characteristics. Emulsification of the aqueous 10 and oil 20 phase combination in the mixing zone 30 may involve the use of a mixing or agitation device such as an impeller, by passing the combined aqueous and oil phases through a series of static mixers at a rate necessary to impart the requisite shear, or combinations of both. Once formed, the HIPE can then be withdrawn or pumped from the mixing zone 30. One method for forming HIPEs using a continuous process is described in U.S. Pat. No. 5,149,720 (DesMarais et al), issued Sep. 22, 1992 and U.S. Pat. No. 5,827,909 (DesMarais) issued on Oct. 27, 1998.

In certain embodiments, for a continuous process the HIPE can be withdrawn or pumped from the mixing zone 30 and transported to a water bath 32 travelling in a substantially horizontal direction. The HIPE may be pumped in a pipe to one or more devices such as a die, sprayer, or caster that delivers the HIPE into the water bath.

In an embodiment, the water bath 32 is between 70 C and 150 C, such as, for example 75 C, 80 C, 85 C, 90 C, 95 C, or 100 C. The water bath may be a rectangular bath allowing for the HIPE to move through the bath as it polymerizes. The water bath may be a large vessel bath wherein the HIPE enters and polymerizes in a set portion of the bath. HIPE may be pumped to different portions of the water bath thereby polymerizing HIPE in a continuous batch process. The water bath can have different additional components such as, for example, electrolytes and initiators. Examples of electrolytes may include any electrolyte which provides ionic species to impart ionic strength to the water phase may be used. Preferred electrolytes are mono-, di-, tri-, or polyvalent inorganics salts such as the water-soluble halides (e.g., chlorides), nitrates and sulfates of alkali metals and alkaline metals or polyelectrolytes. Examples include sodium chloride, calcium chloride, sodium sulfate, magnesium sulfate and partially neutralized poly acrylic acid. Examples include Examples of initiators include, for example, persulfate-bisulfate, persulfate-ascorbic acid, persulfate-thiosulfate, and sodium persulfate (NaPs). Other examples or initiators include peroxides in combination with a reducing agent are a common source of radicals, for example, the reaction of hydrogen peroxide with ferrous ion. Other reductants such as $Cr^{2+}$, $V^{2+}$, $Ti^{3+}$, $Co^{2+}$, and $Cu^+$ can be employed in place of ferrous ion in many instances. Other redox systems include reductants such as $HSO_3^-$, $SO_3^{2-}$, $S_2O_3^{2-}$, and $S_2O_5^{2-}$ in combination with oxidants such as $Ag^+$, $Cu^{2+}$, $Fe^{3+}$, $ClO_3^-$, and $H_2O_2$.

In an embodiment, the water bath may have a redox couple capable of reacting with the initiator present in the emulsion. In an embodiment, the emulsion may contain persulfate or peroxide and the water bath may contain bisulfate, ascorbic acid, or thiosulfate.

In an embodiment, the water bath may have between 0.5% electrolyte and 50% electrolyte, such as, for example 1% electrolyte, 2% electrolyte, 3% electrolyte, 4% electrolyte, 5% electrolyte, 10% electrolyte, 15% electrolyte, 20% electrolyte, 25% electrolyte, 30% electrolyte, 35% electrolyte, 40% electrolyte, or 45% electrolyte. In an embodiment, the water bath may have between 0.5% NaCl and 50% NaCl, such as, for example 1% NaCl, 2% NaCl, 3% NaCl, 4% NaCl, 5% NaCl, 10% NaCl, 15% NaCl, 20% NaCl, 25% NaCl, 30% NaCl, 35% NaCl, 40% NaCl, or 45% NaCl.

In an embodiment, the water bath may have between 0.1% initiator and 20% initiator, such as, for example 0.2% initiator, 0.4% initiator, 0.6% initiator, 0.8% initiator, 1% initiator, 1.2% initiator, 1.4% initiator, 1.6% NaPs, 1.8% initiator, or 5% initiator. In an embodiment, the water bath may have between 0.1% NaPs and 20% NaPs, such as, for example 0.2% NaPs, 0.4% NaPs, 0.6% NaPs, 0.8% NaPs, 1% NaPs, 1.2% NaPs, 1.4% NaPs, 1.6% NaPs, 1.8% NaPs, 2% NaPs, 3% NaPs, 4% NaPs, or 5% NaPs. In an embodiment, the water bath may contain both NaCl, NaPs and any other desirable component that may interact with the HIPE.

As shown in FIG. 1, the HIPE moves into a water bath where the monomers present in the HIPE are polymerized. Without being bound by theory, it is believed that HIPE foam formation comprises two overlapping processes. These are the polymerization of the monomers and the formation of crosslinks between active sites on adjacent polymer backbones. As used herein the term "polymerize" as in to polymerize monomers to form a HIPE foam encompass both polymerization of monomers and formation of crosslinks between active sites on adjacent polymer backbones. Crosslinking provides HIPE foams with strength and integrity that is helpful to their further handling and use.

In certain embodiments, of the present invention can be rapidly polymerized using the water bath. After being inserted into the water bath, HIPEs may be polymerized in less than 20 min, less than 10 minutes, less than 5 minutes, less than 1 min, less than 30 seconds, or less than 15 seconds. The time of exposure of a HIPE foam to a water bath in a continuous process is measured by when a 1 cm long portion, as measure in the machine direction, of the HIPE foam enters and then exits the bath. This rapid polymerization allows a wide variety of HIPE compositions to be used. Because polymerization can occur quickly with the methods of the present invention, a HIPE need only be stable for a short period of time, for instance up to several minutes.

Following polymerization the resulting HIPE foam is saturated with aqueous phase that needs to be removed to obtain substantially dry HIPE foam. In certain embodiments, HIPE foams can be squeezed free of most of the aqueous phase by using compression, for example by running the HIPE foam through one or more pairs of nip rollers 90. The nip rollers 90 can be positioned such that they squeeze the aqueous phase out of the HIPE foam. The nip rollers 90 can be porous and have a vacuum applied from the inside such that they assist in drawing aqueous phase out of the HIPE foam. In certain embodiments, nip rollers 90 can be positioned in pairs, such that a first nip roller 90 is located above a liquid permeable belt 40, such as a belt 40 having pores or composed of a mesh-like material, and a second opposing nip roller 91 facing the first nip roller 90 and located below the liquid permeable belt 40. One of the pair, for example the first nip roller 90 can be pressurized while the other, for example the second nip roller 91, can be evacuated, so as to both blow and draw the aqueous phase out the of the HIPE foam. The nip rollers may also be heated to assist in removing the aqueous phase. In certain embodiments, nip rollers are only applied to non-rigid HIPE foams, that is HIPE foams whose walls would not be destroyed by compressing the HIPE foam. In yet a further embodiment, the surface of the nip rollers may contain irregularities in the form of protuberances, depressions, or both such that a HIPE foam can be embossed as it is moving through the nip rollers. When the HIPE has the desired dryness it may be cut or sliced into a form suitable for the intended application.

In certain embodiments, in place of or in combination with nip rollers, the aqueous phase may be removed by sending the HIPE foam through a drying zone 80 where it is heated, exposed to a vacuum, or a combination of heat and vacuum exposure. Heat can be applied, for example, by running the foam though a forced air oven, IR oven, microwave oven or radiowave oven. The extent to which a HIPE foam is dried depends on the application. In certain embodiments, greater than 50% of the aqueous phase is removed. In certain other embodiments greater than 90%, and in still other embodiments greater than 95% of the aqueous phase is removed during the drying process.

EXAMPLES

Preparation of High Internal Phase Emulsions (HIPE) and their Subsequent Polymerization into Absorbent Foams are Illustrated in the Following Example Example 1

HIPE foams are prepared from a HIPE (5% oil in 95% water); the oil phase is prepared from a 3.35:1 ratio of EHA:EGDMA and 12% PGS as surfactant. The aqueous phase is 2% NaCl and 0.33% NaPS in water. The HIPE is injected into the water bath in the form of fibers. The water baths can be maintained at 85° C. and have varying compositions—pure deionized water, 2% NaCl, 0.33% NaPS, and both 2% NaCl.

Applicants have surprisingly found that the addition of NaCl or other additional components can affect the porosity of the HIPE foam. Specifically, by adding NaCl, NaPs, or a mixture of NaCl and NaPs, Applicants have found that the porosity of the HIPE foam in the water bath can be affected versus the control of deionized water.

As shown in the table below, the porosity of the HIPE foam may be manipulated based on the additional components added to the deionized water. The porosity of the fibers below was determined gravimetrically (by measuring the mass and the dimensions of the fibers).

| Water Bath | Porosity of HIPE foam |
| --- | --- |
| Deionized Water | 99.1% |
| 2% NaCl | 78.9% |
| 0.33% NaPs | 96.5% |
| 2% NaCl + 0.33% NaPs | 80.6% |

Applicants have found that placing electrolytes in the water bath produces a thicker layer of monomer at the HIPE-bath interface prior to curing. This allows one to modify the porosity of the HIPE foam. In a non-limiting embodiment, the water bath composition can create a HIPE foam having a porosity of between 0% and 99.9%, such as, for example, between 0.1% and 99.8%, or between 0.5% and 90%. In a non-limiting embodiment, the water bath composition can create foam having a porosity of less than 99%, less than 98%, less than 95%, less than 90%, less than 85%, less than 80%, or less than 75%. When the bath contains only NaCl, shrinkage occurs during polymerization, leading to fewer windows connecting the pores within the cured HIPE. The presence of initiator in the bath may result in additional growth of a surface layer of polymer.

Applicants have also surprisingly found that the tensile modulus of the fibers may be affected by the composition of the water bath. The tensile modulus for the different water baths is tabled below.

| Water Bath | Tensile Modulus (MPa) of HIPE foam |
|---|---|
| Deionized Water | 1.2 (range 0.4-2) |
| 2% NaCl | 2.5 (range 2-3) |
| 0.33% NaPs | 2.5 (range 1-4) |
| 2% NaCl + 0.33% NaPs | 0.5 (range 0.25-1) |

Figure 2:
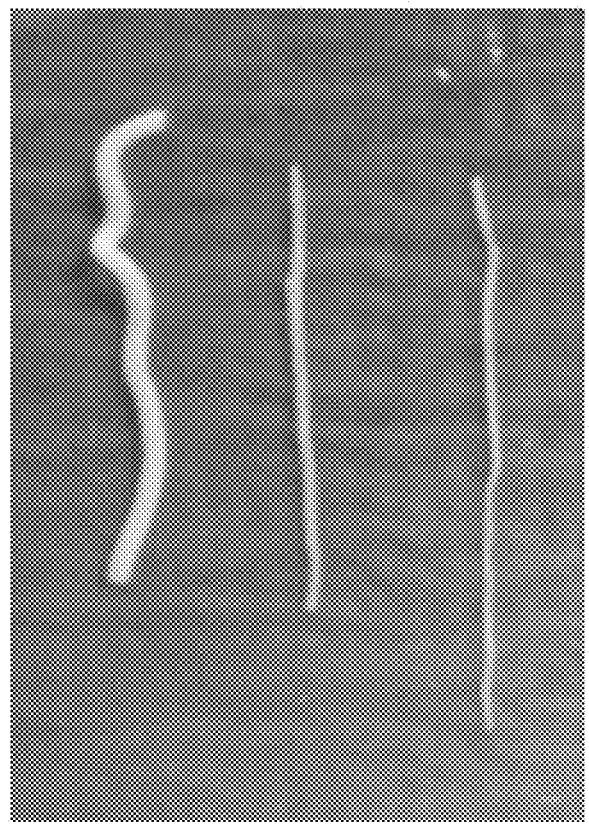
FIG. 2 is an image of several High Internal Phase Emulsion foams.

The composition of the water baths may also affect the fiber denier of the High Internal Phase Emulsion foam. As shown in FIG. 2, different fibers made from different water baths exhibit different cross sectional areas after being extruded from the same diameter opening.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Values disclosed herein as ends of ranges are not to be understood as being strictly limited to the exact numerical values recited. Instead, unless otherwise specified, each numerical range is intended to mean both the recited values and any integers within the range. For example, a range disclosed as "1 to 10" is intended to mean "1, 2, 3, 4, 5, 6, 7, 8, 9, and 10."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing a High Internal Phase Emulsion foam comprising the steps of:
    forming a High Internal Phase Emulsion from
        an oil phase comprising monomer, cross-linking agent, emulsifier,
        an aqueous phase, and
        an initiator in either the oil or aqueous phase;
    pumping the High Internal Phase Emulsion into a water bath;
    curing the High Internal Phase Emulsion in the water bath to form a High Internal Phase Emulsion foam.

2. The method of claim 1, wherein the water bath comprises an electrolyte.

3. The method of claim 2, wherein the electrolyte is selected from the group consisting of mono-, di-, poly-, or tri-valent inorganics salts of the halides, nitrates and sulfates of alkali metals, and alkaline metals.

4. The method of claim 1, wherein the electrolyte is NaCl.

5. The method of claim 1, wherein the water bath comprises an initiator.

6. The method of claim 5, wherein the initiator is selected from the group consisting of persulfate-bisulfate, persulfate-ascorbic acid, persulfate-thiosulfate, and sodium persulfate (NaPs).

7. The method of claim 1, wherein the water bath comprises a redox couple capable of reacting with the initiator present in the emulsion.

8. The method of claim 7, wherein the emulsion comprises persulfate or peroxide and the water bath comprises bisulfate, ascorbic acid, or thiosulfate.

9. The method of claim 1, wherein the High Internal Phase Emulsion foam exhibits a porosity between 0% and 99.9%.

10. The method of claim 1, wherein the water bath has a temperature between 70 C and 150 C.

11. A method for producing a High Internal Phase Emulsion foam comprising the steps of:
    forming a High Internal Phase Emulsion from
        an oil phase comprising monomer, cross-linking agent, emulsifier,
        an aqueous phase, and
        pumping the High Internal Phase Emulsion into a water bath;
    curing the High Internal Phase Emulsion in the water bath to form a High Internal Phase Emulsion foam.

12. The method of claim 11, wherein the water bath comprises an electrolyte.

13. The method of claim 12, wherein the electrolyte is selected from the group consisting of mono-, di-, poly-, or tri-valent inorganics salts of the halides, nitrates and sulfates of alkali metals, and alkaline metals.

14. The method of claim 11, wherein the electrolyte is NaCl.

15. The method of claim 11, wherein the water bath comprises an initiator.

16. The method of claim 15, wherein the initiator is selected from the group consisting of persulfate-bisulfate, persulfate-ascorbic acid, persulfate-thiosulfate, and sodium persulfate (NaPs).

17. The method of claim 11, wherein the High Internal Phase Emulsion foam exhibits a porosity between 0% and 99.9%.

18. The method of claim 11, wherein the water bath has a temperature between 70 C and 150 C.

19. A method for producing a High Internal Phase Emulsion foam comprising the steps of:
    forming a High Internal Phase Emulsion from
        an oil phase comprising monomer, cross-linking agent, emulsifier,
        an aqueous phase, and
        pumping the High Internal Phase Emulsion into a water bath comprising between 0.1% and 5% NaCl;
    curing the High Internal Phase Emulsion in the water bath to form a High Internal Phase Emulsion foam.

* * * * *